May 4, 1954

J. A. RONNING 2,677,432

CAM ACTUATED STEERING BY DRIVING

Filed Sept. 26, 1949

Inventor
Jacob A. Ronning
By his Attorneys
Merchant & Merchant

May 4, 1954   J. A. RONNING   2,677,432
CAM ACTUATED STEERING BY DRIVING
Filed Sept. 26, 1949   6 Sheets-Sheet 5

Inventor
Jacob A. Ronning
By his Attorneys
Merchant & Merchant

May 4, 1954  J. A. RONNING  2,677,432
CAM ACTUATED STEERING BY DRIVING
Filed Sept. 26, 1949  6 Sheets-Sheet 6

Inventor
Jacob A. Ronning
By his Attorneys
Merchant & Merchant

Patented May 4, 1954

2,677,432

UNITED STATES PATENT OFFICE 2,677,432

CAM ACTUATED STEERING BY DRIVING

Jacob A. Ronning, Minneapolis, Minn.

Application September 26, 1949, Serial No. 117,769

7 Claims. (Cl. 180—6.34)

My present invention relates to self-powered vehicles, and more particularly to relatively low-speed vehicles of the kind commonly referred to as tractors, and which are generally employed for performing various work functions, such as pulling or pushing loads or carrying different kinds or types of implements or devices.

One important object of the present invention is the provision of an extremely simple low-cost power-transmission mechanism for self-powered vehicles.

Another important object of the invention is the provision of a self-powered vehicle having great maneuverability, making it possible to work in unusually close quarters and among obstructions which would seriously hamper conventional vehicles.

Another important object of the invention is the provision of an improved power transmission mechanism interposed between the prime mover or engine of a vehicle and the laterally-spaced drive wheel thereof, having inherent characteristics allowing a difference in speed between the drive wheels to facilitate turning of the vehicle without the use of expensive, complicated differential mechanisms or other auxiliary devices or apparatus.

Another important objective of the invention is the provision of an improved friction-type power transmission mechanism for vehicles of the class described.

The above and other highly important objects of the invention will be made apparent from the following specification, claims, and appended drawings.

In the accompanying drawings, like characters indicate like parts throughout the several views.

Referring to the drawings.

First to be described will be Figs. 1 to 9, inclusive, and the preferred embodiment of the invention disclosed therein. Referring to these figures, the vehicle disclosed in these figures comprises a generally horizontal frame structure 1, laterally-spaced ground-engaging drive wheels 2, and a steerable ground wheel 3. The drive wheels 2 are independently journalled on a common stationary axle 4, which latter is mounted on the frame 1 through the medium of brackets 5. The steerable wheel, which in this instance is at the rear of the machine, is journalled at 6 in the lower end portion of a steering fork 7, which latter is vertically journalled for steering movements at 8 in a cross member 9 of frame 1. The vehicle shown is provided with an operator's seat 10, mounted on the rearwardly-projected end portion of a rearwardly extending auxiliary frame structure 11, that is pivoted to the intermediate portion of frame 1 at 12, the seat 10 and underlying portion of frame 11 being resiliently supported from the frame structure 1 through the medium of a coil compression spring or springs 13.

For imparting steering movements to the steerable wheel 3, there is provided a steering gear comprising a journalled steering post 14 and a steering wheel 15. The steering post 14 is journalled adjacent its lower end to the frame structure 1 through the medium of a suitable bearing sleeve 16 and frame-supported bearing brackets 17 and 18. The steering post 14 is operatively coupled to the fork 7 of the steerable wheel 3 by linkage comprising a beveled gear 19 fast on the steering post 14, cooperating gear segment 20 fast on a frame journalled sleeve 20', a shaft 21 mounted for rotary and axial sliding movements in sleeve 20' (see Fig. 6), a chain sprocket 22 also fast on sleeve 20', and a link chain 23 running over sprocket 22, and a sprocket 24 fast on the journalled portion 8 of fork 7.

The vehicle's prime mover is indicated as an entirety by 25, which, as shown, is in the nature of a conventional internal combustion gas engine supplied with liquid fuel from a suitable tank 26 and provided with an exhaust muffler 27.

Interposed between the engine 25 and drive wheels 2 are two like speed-reducing direction reversing power transmission mechanisms, each indicated as an entirety by 28 and each driving a different drive wheel 2. Preferably, and as illustrated, each of these transmission mechanisms 28 is of the friction type comprising a pair of engine-driven roller elements 29 and 30, and a roller-driven wheel driving drum element 31. The engine-driven roller elements 29 of opposite transmission mechanisms 28 are mounted fast on opposite ends of a shaft 32, and the roller elements 30 of opposite transmission mechanisms 28 are mounted fast on opposite ends of a shaft 33 (see particularly Fig. 7). The shafts 32 and 33 are journalled in opposite sides of a transmission gear case 34 mounted fast on the frame structure 1 and located between the friction-type transmission mechanisms 28. The roller elements 29 and 30 of the transmission mechanisms 28 are, preferably, and as shown, constantly driven in opposite directions from the engine 25 through driving connections comprising intermeshing spur gears 35 and 36 fast on shafts 33 and 32, respectively, a direction reversing gear 37 intermeshing with gear 36 and mounted fast on a shaft 37', a gear 38' fast on a shaft 38, a belt pulley 39 fast on the outer end of shaft 38, and an engine-driven belt 40, the latter being assumed to be driven from the engine through the medium of an engine shaft mounted pulley, not shown. The shaft 38 is journalled in suitable bearings in opposite sides of the gear case 34.

The roller-driven drum elements 31 of the opposite transmission mechanisms are each coupled to an opposite drive wheel 2 by driving connections comprising a drum-driven shaft 41 extending axially outwardly from and mounted fast in its respective drum 31, a chain sprocket 42 fast on the outer end of each shaft 41, a chain sprocket 43 fast on each drive wheel 2, and link drive chains 44 running over cooperating chain sprockets 42 and 43.

The rims of the drums 31 are internally provided with friction facings 45 for friction engagement with their respective cooperating rollers 29 and 30. Each transmission mechanism 28 provides neutral, forward and reverse drive for its respective wheel 2. The rollers 29 and 30 are preferably of steel throughout and are both spaced from their respective cooperating drum 31 when their respective transmission mechanisms are in neutral, as shown, for example, in Fig. 3. In the arrangement illustrated, the drums 31 revolve in the same direction as do the wheels 2, the rollers 29 being engine-driven in a direction to produce forward drive rotation of drums 31, and the roller elements 30 being engine-driven in a direction to produce rearward drive of their respective drums. Shifting of the transmission mechanisms is achieved by relative shifting of the rollers with respect to the drums. In the arrangement illustrated, shifting of the transmission mechanisms 28 from neutral position, shown in Fig. 3, to forward drive position, shown in Fig. 5, or reverse drive position, as shown in Fig. 4, is accomplished by shifting the drums 31 from neutral position of Fig. 3 to forward drive position of Fig. 5 or reverse drive position of Fig. 4. For this purpose, the drums 31 are mounted from the frame structure 1 for shifting movements with respect to said frame through a mechanism as follows: The shaft 41 of each drum 31 is journalled in a long bearing sleeve 46, mounted fast on the rearwardly-extended end of an opposite one of a pair of oscillatory arms 47; the oscillatory drum-mounting arms 47 being pivoted at their front end portions to the frame structure 1 at 48. It will now be obvious that shifting of either of the drums 31 on its mounting axis 48 in a counterclockwise direction with respect to Fig. 3 through Fig. 5, will shift that transmission mechanism from neutral drive to forward drive, and that shifting of the drum 31 of either transmission mechanism on its axis 48 in a clockwise direction with respect to Fig. 3 through Fig. 5 will produce forward drive of that transmission.

The bearing sleeve 46 of each transmission mechanism 28 is equipped with a rigidly-anchored rearwardly-projecting shifter arm 49, which, in the preferred embodiment of the invention illustrated, is provided at its free rear end portion with a bifurcated fork-like shifter head 50, providing outwardly-diverging cam surfaces 51 and 52. For the purpose of selectively but simultaneously shifting the drums 31 of transmissions 28 from neutral to forward or reverse drive, I provide shifting mechanism comprising a manually-operated shifting lever 53 fast on a rock shaft 54, a pair of rock arms 55, a pair of rigid links or rods 56, and opposed resilient links in the form of compression springs 57 and 58. The rock shaft 54 is journalled in suitable bearings carried by the frame structure 1, and the rock arms 55 are fast on rock shaft 54. Each rock arm 55 is pivoted to the lower end of a different one of said links 56, and each thereof work slidably through a flange 59 of a different one of said shifter arms 49. The springs 57 and 58 of each rigid link 56 are telescopically applied thereon and engage opposite sides of a shifter arm flange 59. The springs 57 and 58 are maintained under compression against opposite sides of the shifter arm flanges 59 by means of compression adjusting nuts 60 screw-threaded on the rigid links or rods 56.

Figure 1:
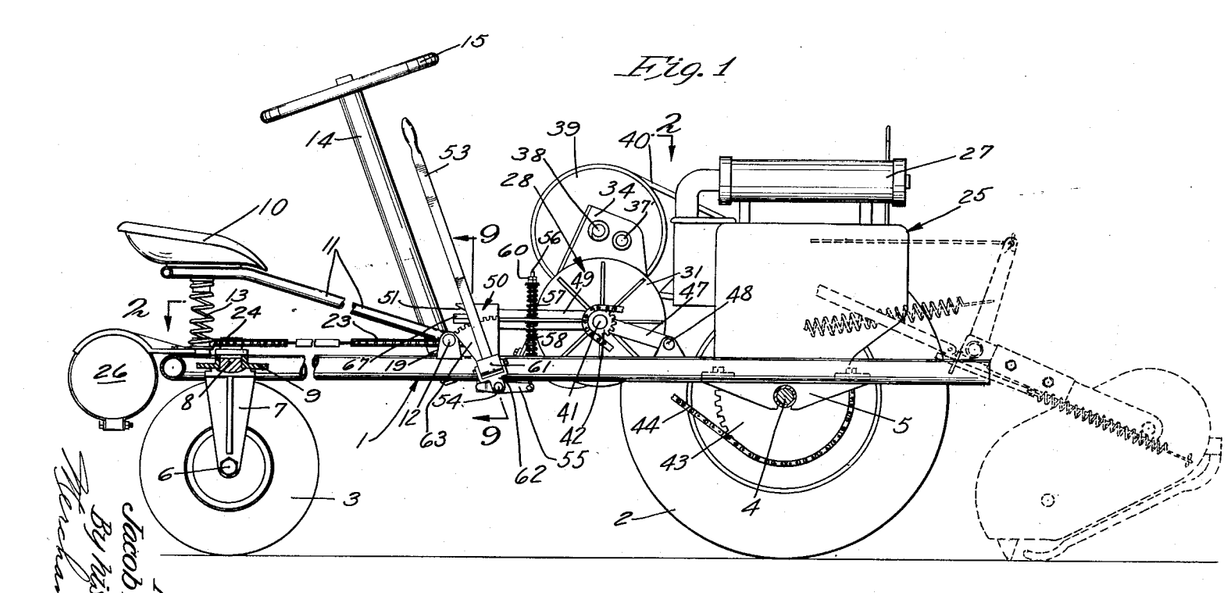
Fig. 1 is a view in elevation, with some parts broken away and some parts shown in section, of a vehicle, in the nature of a tractor, incorporating a preferred embodiment of the invention.
Figure 3:
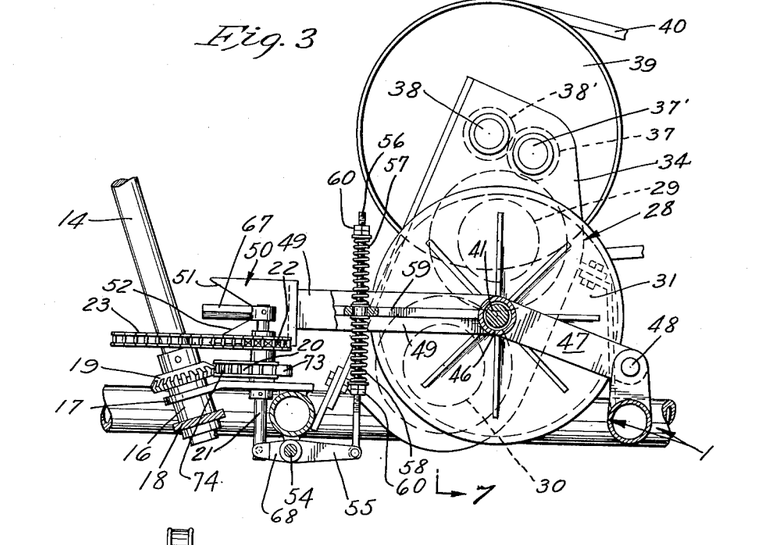
Fig. 3, 4 and 5 are enlarged fragmentary sectional views, taken on the line 3—3 of Fig. 2, and showing different positions of the parts.
Figures 4, 5, 6:
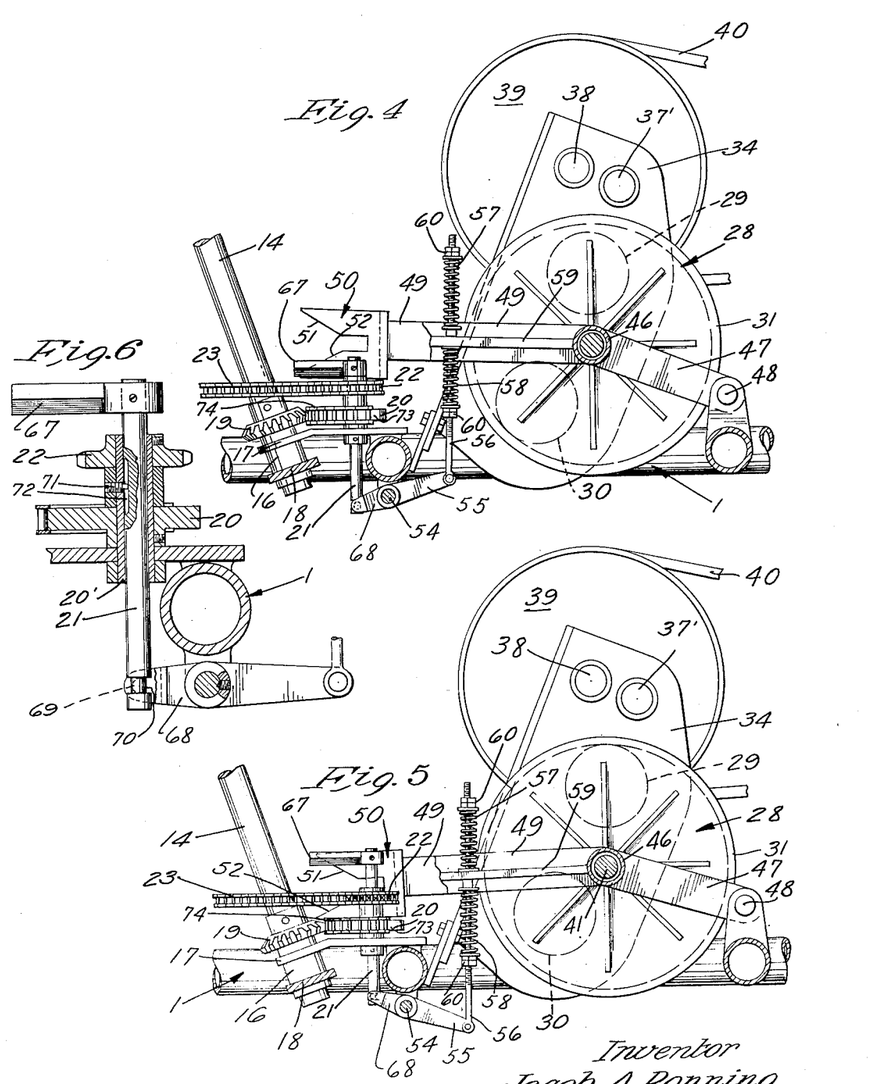
Fig. 6 is an enlarged sectional detail view, with some parts broken away, taken on the line 6—6 of Fig. 2.
Figure 7:
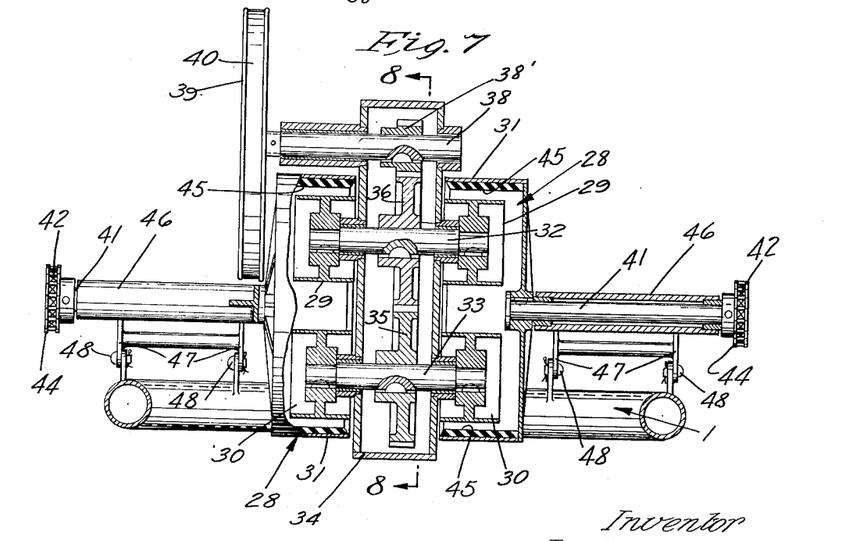
Fig. 7 is a detail sectional view, taken on the line 7—7 of Fig. 3.
Figure 8:
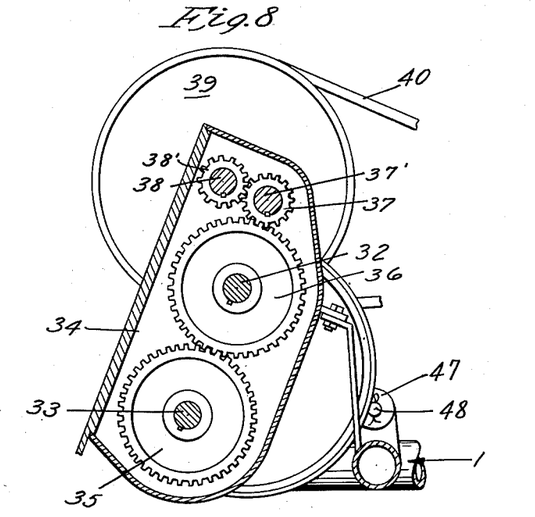
Fig. 8 is a detail sectional view, taken on the line 8—8 of Fig. 7.
Figure 9:
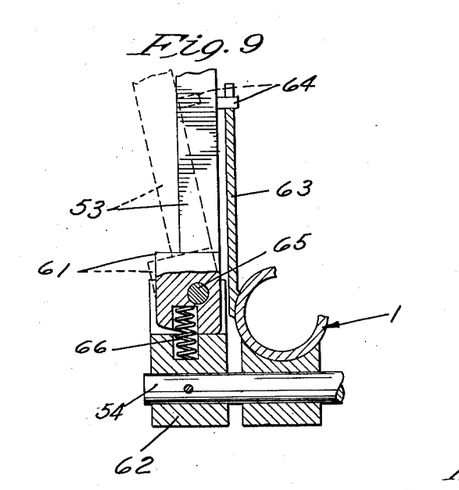
Fig. 9 is an enlarged detail sectional view, taken on the line 9—9 of Fig. 1.

The shifting lever 53, as shown, is a composite structure comprising the main shank or stem thereof, a rigid head 61 and a yoke 62; the head 61 being pivoted in the yoke 62 for lateral swinging movements, and the yoke 62 being fast on rock shaft 54. For the purpose of maintaining the shifter lever 53 in selectively adjusted positions, there is provided a toothed segment 63 mounted fast on the frame structure 1 (see particularly Fig. 9), and a cooperating dog or detent 64 fast on lever 53, and which is moved into and out of intermeshing engagement with the teeth of segment 63 by lateral movements of shifter lever or arm 53 on axis 65 (see Figs. 1 and 9). The shifting lever 53 is maintained under yielding pressure to move its detent 64 into intermeshing engagement with the teeth of segment 63 by means of a coil compression spring 66. From the above, the following should be apparent, to wit:

(A) When the shifting lever 53 is in its intermediate position, as shown in Fig. 1, the drum elements 31 of both transmission mechanisms 28 will be out of frictional engagement with their cooperating roller elements 29 and 30, as shown best in Fig. 3; both transmission mechanisms being then in neutral drive;

(B) When the shifting lever 53 is moved forwardly from its intermediate position of Fig. 1, the drums 31 of both transmission mechanisms 28 will be shifted toward and into engagement with their respective cooperating forward drive roller elements 29 to produce forward drive of the wheels 2;

(C) When the shifting lever 53 is moved rearwardly from its intermediate position of Fig. 1, the drum elements 31 of both transmission mechanisms 28 will be shifted into engagement with their respective cooperating friction drive roller elements 30 to produce rearward drive to the wheels 2; and (D) Speed or ratio of drive between the engine 25 and wheels 2 being variable in either forward drive or reverse drive depending upon the amount of slippage allowed between the drum elements 31 and their respective cooperating roller elements 29 or 30; this factor being determined by the amount of pressure applied between the drum elements 31 and cooperating roller elements 29 or 30, which is, in turn, controlled by the amount of compression of springs 57 or 58 after engagement of drum elements 31 with their cooperating roller elements 29 or 30 through the medium of shifting lever 53, rock shaft 54, rock arm 55 and rod or link 56.

In carrying out the invention, the direction or angle of approach between the drum elements 31 and the roller elements 29 and 30, respectively, is very important. In this connection it will be understood that if the angle of approach between the drum elements 31 and roller elements 29 and 30 be in, or substantially in, a plane radial to the axis of the drum elements 31 and the axes of engaged roller elements 29 and 30, the frictional driving force or pressure exerted between the drum elements 31 and engaged roller elements 29 or 30 will be neither increased or decreased as a result of frictional driving force exerted by engaged roller elements 29 or 30 with their respective cooperating drum elements 31; the pressure of force between the engaged roller elements 29 or 30 with their drum elements 31 being then, in fact, the same regardless of whether the driving energy is applied by the rollers to the drum elements or by the drums to the roller elements.

As an important feature of the present invention, the angle or direction of approach of the drum elements 31 of the transmission mechanisms 28 to their respective cooperating roller elements 29 and 30 is such that the driving energy frictionally transmitted from the roller elements 29 and 30 to the drum elements 31 will tend to draw the engaged drum and roller elements into tighter and tighter frictional engagement under increases in driving torque transmitted from the roller elements to the drum elements; the resultant increase in frictional pressure between the drums and rollers being additive to that being at the time exerted by the drum elements 31 on their respective engaged roller elements 29 or 30 by compression springs 57 or 58. By particular reference to Fig. 3, it will be seen that this action is achieved, in the present instance, by mounting the drums for shifting movements on shifting axes 48, which are radially outwardly of the drums in one direction, and by spacing the rollers 29 and 30 of each mechanism apart less than 180° with relation to the drum rotation axis and radially outwardly of the drum rotation axis in a direction opposite the shifting axis 48 of the drum; the center of a triangle drawn between the drum shifting axis 48 and the axes of rollers 29 and 30 being in a plane through axis 48 and the axis of rotation of the drum 31 when said drum is in its centered neutral position of Fig. 3. In the particular example given, the rollers 29 and 30 are spaced apart approximately 134°, as measured on an arc concentric with the axis of a neutrally positioned drum 31 and located on the side of the drum rotation axis opposite the drum shifting axis 48. In other words, in the present example, the rollers 29 and 30 are circumferentially spaced approximately 67° in opposite directions from a plane extending through the axes 48 and 41 when the drum is in its centered neutral position of Fig. 3 when measured on an arc spaced from the axis 41 in a direction opposite the shifting axis 48.

Although the drums are actually shifted in an arcuate path, the extent of movement of the drums after an initial engagement with rollers 29 or 30 is so small that the result is substantially identical to that which will be achieved by straight-line shifting movements of the drum. Hence, in accordance with the present example, it may be said that the angle of approach of each drum 31 to its rollers 29 and 30, respectively, is the arcuate or angular distance between one plane that is tangent to an arc having its axis at the drum shifting axis 48 and intersecting the point of contact between the engaged roller 29 or 30 and drum and another plane tangential to the engaged surfaces of drum and roller 29 or 30 at the point of contact therebetween and which, in the present instance, is approximately 42°. In the present instance, the last-mentioned planes are spaced from the first-mentioned planes in the direction of rotation of the drum under the influence of its engaged roller element 29 or 30. However, if the structure were such that the roller elements 29 and 30 were shifted and drums were stationary, then the condition last-above expressed would be just reversed. It should be understood that the extent of increased pressure between engaged rollers and drums as a result of driving torque or force applied to the drums through the rollers may be increased by decreasing the so-called angles of approach of the drum to the rollers 29 and 30 and may be decreased by increasing the angles of approach of the drums to the rollers 29 and 30, up to a maximum of 90° when said angles of approach are arrived at on the basis above given.

With the angle and direction of approach of the drums 31 to the rollers 29 and 30, as herein illustrated and described, for example, the pressure between the drums and engaged rollers is not only increased as a result of the transfer of driving energy from the rollers to the drums, but is similarly decreased as a result of driving energy being transmitted from the drums to the rollers. This dual function is highly important for the following reasons, to wit:

(A) When the drums are being driven from the engine-driven rollers, increased torque on the rollers automatically increases the friction and torque-transferring ability between the engine-driven rollers and roller-driven drums, which automatically maintains a comparatively uniform slippage factor under quite wide variations in torque transfer between rollers and drums; and (B) When the drums apply driving force to the rollers, as do the outside wheels 2 when making a turn, the drums tend to move away from their engaged roller elements 29 or 30 against the action of the springs 57 or 58 to automatically decrease the frictional driving resistance between the drums and rollers, thereby greatly facilitating steering of the vehicle by means of the steerable wheel 3, by allowing the drums to slip with their respective cooperating engaged rollers 29 and 30 and run ahead thereof when torque transfer is from drums to rollers. By this action, a differential effect is automatically obtained allowing the drive wheels 2 to run one ahead of the other when the vehicle is turned responsive to turning action of the steerable wheel 3.

To further increase the maneuverability of the vehicle described, I preferably provide steering gear-controlled transmission shifting mechanism, presently to be described, and which, in the preferred embodiment of the invention under consideration, is ineffective under intermediate steering movements of the steering gear and steerable wheel 3 to either side of a normal straight-ahead condition of the steering gear and steerable wheel. This steering gear-controlled transmission shifting mechanism, as illustrated in Figs. 1, 3, 4, 5 and 6, comprises the forked head of the shifting arm 49 of each transmission mechanism 28, an oscillatory arm 67 mounted fast on the upper end of steering gear shaft 21, a short rock arm 68 having one end mounted fast on rock shaft 54, said rock shaft 54, the rock arms 55, the rigid links or rods 56, the compression springs 57 and 58, and the shifter arms 48 of the transmission mechanisms 28. The short rock arm 68 is forked or bifurcated at its outer end to receive the lower end of shaft 21, to which it is coupled for sliding movements only with the shaft 21, by means of opposed pins 69 working in an annular channel 70 in shaft 21. With this arrangement, vertical reciprocating movements of the shaft 21 are transferred to the rock arm 68 and parts rigid therewith, but the shaft 21 is free to rotate on its axis independently of the rock arm 68. By particular reference to Fig. 6, it will be seen that the shaft 21 is coupled to the sleeve 20' for rotary movements therewith by means of a set screw 71, having a reduced diameter head which works in a key-way like slot 72 of shaft 21, which latter allows the shaft 21 to work axially within the sleeve 20'.

Figure 2:
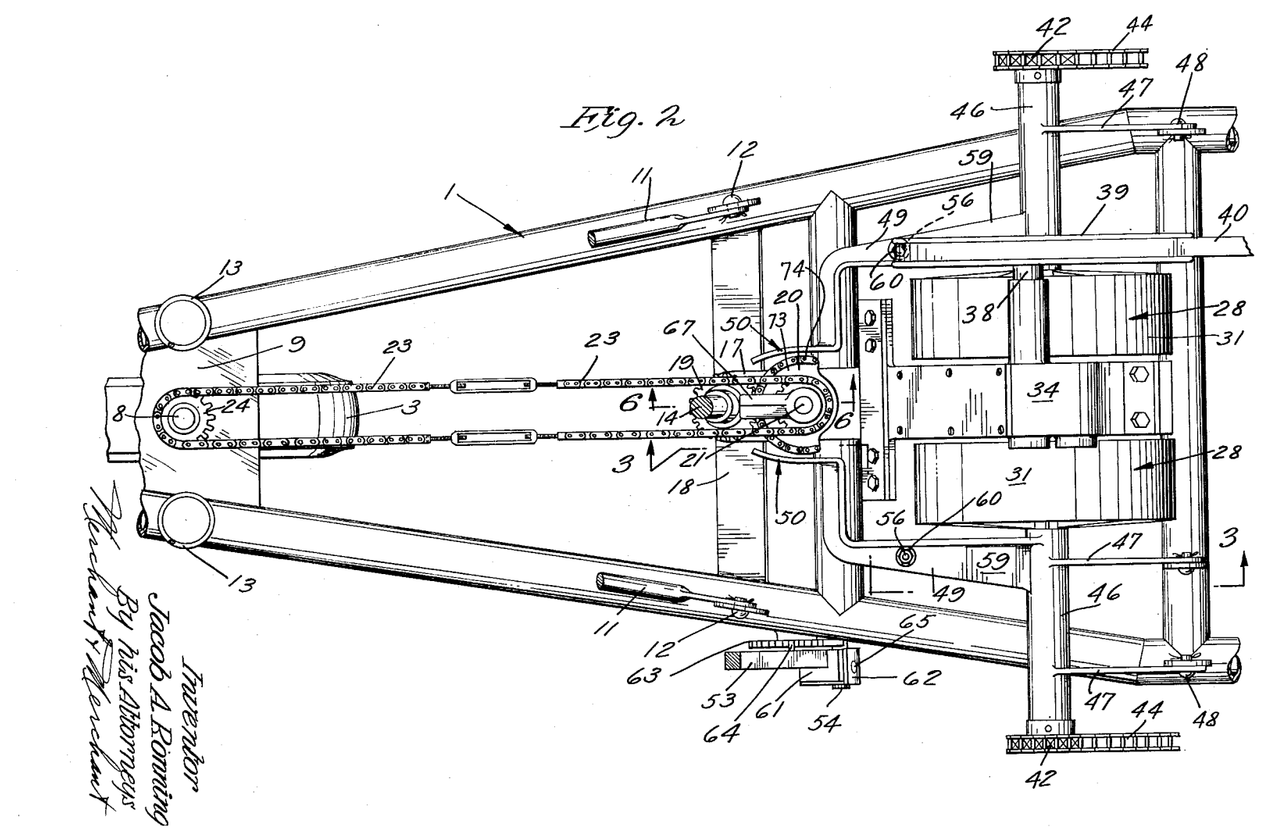
Fig. 2 is an enlarged fragmentary view of the machine shown in Fig. 1, showing some parts in top plan and some parts sectioned on the line 2—2 of Fig. 1.

By reference now particularly to Fig. 2, it will be seen that the steering gear-operated oscillatory arm 67 faces rearwardly of the machine and is positioned in circumferentially-spaced relation in opposite directions to the forked heads 50 of shifter arms 49 of opposite transmission mechanisms 28 when the steerable wheel 3 is in a position to produce straight-line movement of the vehicle. By reference to this Fig. 2, it will also be seen that this oscillatory arm 67 is generally rectangular in cross-section providing two pairs of cam surfaces and that considerable turning movements of the vehicle guiding means comprising the steerable wheel and steering gear, to either side of the straight-line of position shown in Fig. 2, will be required to bring a cam surface of the oscillatory arm 67 into engagement with either of the shifter arm heads 50. Hence, throughout the intermediate operating range of the steering gear and steerable wheel, the steering-gear operated transmission shifting mechanism will be inoperative. However, by reference to Fig. 2, it will be equally clear that steering movements of the steering gear and steerable wheel 3 in either direction from the normal straight-line position of Fig. 2 beyond the intermediate range of the steering gear, will bring the oscillatory arm 67 into one or the other of the bifurcated or forked shifter arm heads 50. With the arrangement illustrated, relatively sharp right-hand turning movements of the steering gear and steerable wheel 3 will bring the oscillatory arm 67 into engagement with the head 50 of the transmission mechanism 28 driving the right-hand drive wheel 2, and relatively sharp left-hand movements of the steering gear and steerable wheel 3 will bring the oscillatory arm 67 into engagement with the head 50 of the transmission mechanism 28 driving the left-hand drive wheel 2. Before going further, it is desired to call attention to the fact that the gear segment 20, as shown, is in the nature of a segmental plate 73 having a section of link roller chain 74 applied around its segmental surface and anchored thereto to provide roller teeth for intermeshing engagement with the teeth of beveled gear 19.

When the transmission shifting lever 53 is in its neutral position of Fig. 1, the vertical centers of the bifurcated shifter heads 50 of opposite transmission mechanisms 28 will lie in a common horizontal plane, which will also be common to the vertical center of the oscillatory arm 67, all as shown in Figs. 1 and 3. However, when the shifting lever 53 is moved forwardly to its forward drive position, the bifurcated shifter heads 50 of both transmission mechanisms 28 will be dropped to the position shown in Fig. 5, wherein it will be noted that the oscillatory arm 67 is now aligned with the upper cam surfaces 51 of each of the bifurcated shifter heads 50, and when the shifter lever 53 is moved rearwardly to its reverse drive position, the bifurcated shifter heads of opposite transmission mechanisms 28 will be raised to the position shown in Fig. 4, to bring the lower cam surfaces 52 of opposite heads 50 into alignment with oscillatory arm 67. In fact, it is important to note in connection particularly with Figs. 3 to 6, inclusive, that downward shifting movements of the shifter arms 49 and heads 50 from the neutral position of Fig. 3 to the forward drive position of Fig. 5 produce a similar upward shifting movement of shaft 21 and oscillatory arm 67 imparted by the short rock arm 68, and that upward shifting movements of the shifter arms 49 and heads 50 from the neutral position of Fig. 3 to the reverse drive position of Fig. 4 produce a similar downward shifting movement of shaft 21 and oscillatory arm 67, also imparted by rock arm 68; the alignment of oscillatory arm 67 with cam surfaces 51 and 52 being the result of compound movements in opposite directions of heads 50 and oscillatory arm 67 and the shaft 21.

*Operation, Figs. 1 to 9, inclusive*

Assuming now that the engine 25 has been started to produce continuous opposite direction rotation of rollers 29 and 30 of both transmission mechanisms 28, operation of the machine will be as follows: So long as the shifting lever 53 is in its intermediate neutral position of Fig. 1, the rollers 29 and 30 of both friction drive transmission mechanisms 28 will be spaced from their respective cooperating drums 31 and will idle freely without transmitting any power whatsoever to the drums. To shift the transmission mechanisms 28 both into forward drive, the shifting lever 53 is moved forwardly to bring the drums 31 of both transmission mechanisms into frictional driving engagement with their respective cooperating forward drive rollers 29. In overcoming the inertia of the machine at the start, the friction drive transmission mechanisms 28 will function as slippage clutches permitting the load to be picked up gradually or rapidly as desired, and, at all times, transmission mechanisms 28 may be used as variable speed devices by controlling of the infinitely variable slippage factor thereof; the latter being under complete control of the operator. In most instances, however, relatively positive or non-slippage transmission of power will be desired from the rollers to the drum, and this is accomplished by shifting the lever 53 to a position wherein the compression springs 57 exert a considerable yielding pressure between the drums and engaged rollers 29. Under these conditions, the vehicle will travel in a forward direction with substantially no slippage between the engine-driven rollers and roller-driven drums so long as the vehicle is steered or guided in a relatively straight line. However, when, under these same conditions, the direction of the vehicle is subject to change as a result of steering movements of the steering gear and steerable wheel 3, the outside drive wheel 2 will tend to run faster than the inside drive wheel, and this action will be automatically permitted by slippage, which will take place between the drum driving the outside wheel and the engaged roller, due to the fact that when driving energy is transmitted from the drum to the cooperating roller, the drum and roller will tend to separate and permit relatively free slippage. The automatic differential action thus achieved between the drive wheels 2 is sufficient to permit relatively free directional guidance of the machine throughout at least the intermediate steering range of the steering gear, and without producing any skidding of the ground wheels 2, and without producing undue wear of the frictional surfaces of the drum and rollers.

From the foregoing, it will be understood that the machine will be driven through both transmission mechanisms 28 and drive wheels 2 when guided in a relatively straight line, but will be driven only by its inside drive wheel 2 and cooperating transmission mechanism 28 while being subject to direction changes responsive to movements of the steering gear and steerable wheel 3 within the intermediate steering range thereof. However, when a relatively sharp turn in either direction is to be made, maneuverability of the machine is greatly facilitated by the otherwise inoperative or ineffective steering gear-operated transmission mechanism, which will then come into play and function as follows:

Assuming now that the vehicle is being driven forwardly and is subject to a sharp turn to the right or left, the steering gear-operated arm 67, which is now in alignment with the upper end portions of cam surfaces 51 of heads 50, as shown in Fig. 5, will be brought into engagement with the said upper end portion of the cam surface 51 of head 50 of the shifter arm 49 of the transmission mechanism 28 for the drive wheel 2 at the inside of the right or left-hand turn being negotiated. After initial engagement of the arm 67 with an engaged cam surface 51, further turning movements of said arm 67 responsive to further turning movements of the steering gear and steerable wheel 3 in the same direction will cause an upward shifting of the engaged head 50 together with its shifter arm 49 and power transmission drum 31, first to the neutral drive position of Fig. 3 and then to the reverse drive position of Fig. 4, against the action of cooperating compression spring 57. When the transmission mechanism 28 for the inside drive wheel is thus shifted into neutral, the drive from the engine will be immediately transferred from the inside drive wheel 2 to the outside drive wheel 2, and when the transmission mechanism 28 driving the inside drive wheel is finally thrown into reverse drive, the opposite drive wheels 2 will be driven in opposite directions. It will be obvious that with this arrangement, overall maneuverability of the machine is greatly increased, and exceedingly sharp turns may be negotiated with the greatest of ease. In fact, the machine may be made to turn pivotally about a stationary vertical axis laterally intermediate the drive wheels 2.

Now if we assume that the vehicle is being driven rearwardly, with both transmission mechanisms 28 positioned as in Fig. 4, and is subject to a sharp turn to the right or left, the steering gear-operated arm 67, which will now be in alignment with the lower portions of cam surfaces 5 of heads 50 of both transmission mechanisms 28, as shown best in Fig. 4, will be brought into engagement with the said lower end portion of cam surface 52 of the head 50 for the shifter arm 49 of the transmission mechanism 28 for the drive wheel 2 at the inside of the right or left-hand turn being negotiated. After initial engagement of arm 67 with an engaged cam surface 52, further turning movements of the arm 67 responsive to further turning movements of the steering gear and steerable wheel in the same direction will cause a downward shifting of engaged head 50, together with its shifter arm 49 and power transmission drum 31, first into neutral drive position of Fig. 3, and then to the forward drive position of Fig. 5 against the action of cooperating compression spring 58, thereby accomplishing relatively opposite drives exactly in the manner described above in connection with forward drive.

Figure 10:
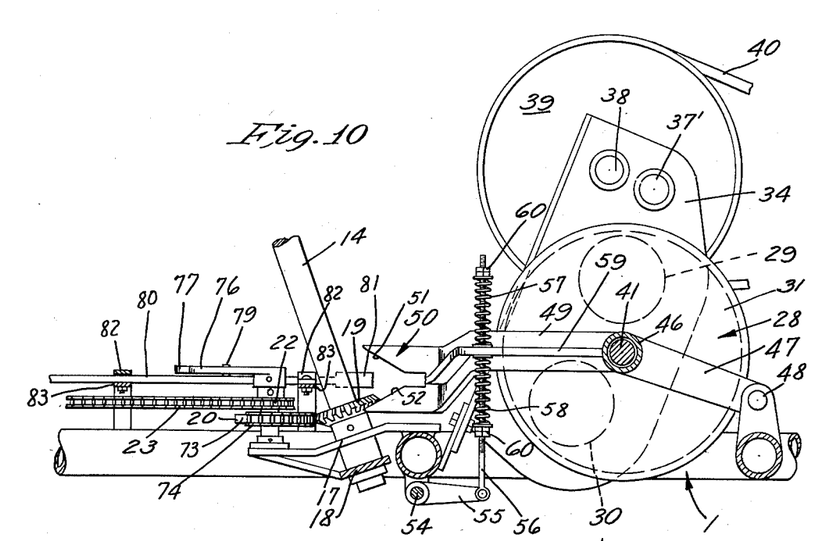
Fig. 10 is a fragmentary view corresponding to Fig. 3, but showing a somewhat modified form of the invention.
Figure 11:
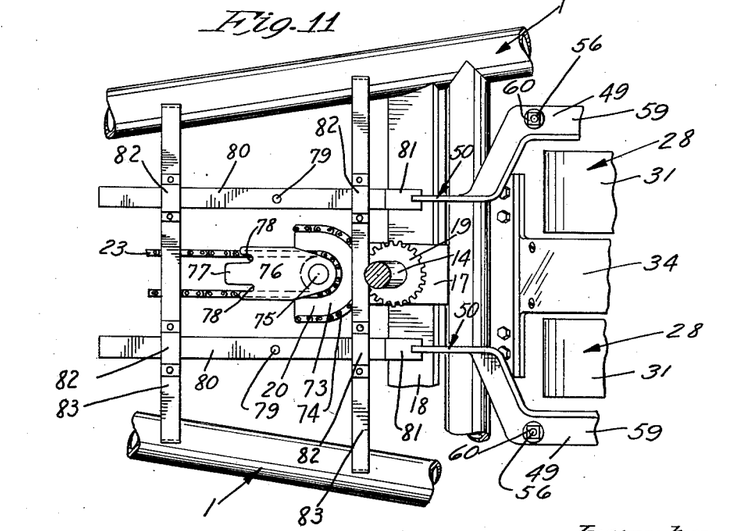
Fig. 11 is a fragmentary plan view of that portion of the machine shown in Fig. 10.

*Description, Figs. 10 and 11*

In these figures, parts corresponding to parts described in connection with Figs. 1 to 9, inclusive, will be indicated by like characters. The vehicle of these figures, although only shown in fragmentary form, may be assumed to be like that shown and described in connection with previously-described Figures 1 to 9, inclusive, with the single exception of the steering gear-operated transmission control mechanism. Hence, with the exception of the steering gear-controlled transmission shifting mechanism, the machine of these Figs. 10 and 11 will operate exactly as does the machine of Figs. 1 to 9, inclusive. In fact, the only function provided for in the device or apparatus of Figs. 1 to 9, inclusive, not provided for in the modified form of Figs. 10 and 11 is the automatic singular reversing of the transmissions 28 by the steering gear-operated transmission shifting mechanism, as a result of extreme right or left-hand turning movements of the latter; the steering gear-operated shifting mechanism of Figs. 10 and 11 functioning only to shift the transmission mechanism 28 driving the inside drive wheel 2 into neutral drive, responsive to extreme right or left-hand turning movements of the steering gear.

In Figs. 10 and 11, the steering gear-operated sprocket 22 and segment 29 are mounted fast on a frame-journalled shaft 75, which carries an oscillatory arm or head 76 at its upper end. This oscillatory head or arm 76 is mounted fast on shaft 75 and is formed adjacent its outer end to provide a tongue 77 and laterally-spaced outwardly opening pin-receiving notches 78. The tongue 77 and notches 78 cooperate with shifter pins 79 carried by and upstanding from a laterally-spaced pair of slide bars 80 that are provided at their front end portions with heads 81 for engagement with the cam surfaces 51 and 52 of shifter heads 50 of opposite transmission mechanisms 28. By reference to Fig. 11, it will be seen that the slide bars 80 extend longitudinally of the machine, are mounted for forward and rearward sliding movements in bearing brackets 82 in transverse frame cross members 83, and are each laterally aligned with an opposite shifter head 50. By reference particularly to Fig. 10, it will be noted that the slide bars 80 and their heads 81 are vertically aligned with the vertical centers of the heads 50 when the latter are in their neutral drive positions, shown in Fig. 10. In Figs. 10 and 11, the slide bars 80 are both shown as retracted to their normal inoperative positions, wherein they, in no way, influence or obstruct shifting of the transmission mechanisms responsive to the manual control lever 53, rock shaft 54, rock arm 55, rigid link or rod 56, and compression springs 57 and 58. In fact, throughout the entire intermediate steering range of the steering gear, on either side of a straight line position thereof and the steerable wheel 3, the oscillatory arm or head 76 will operate free and independent of the pins 79 of slide bars 80 and produce no movement whatsoever of the latter. However, upon extreme right or left-hand turning movements of the steering gear and its steering post 14, the tongue 77 of oscillatory arm 76 will be brought into engagement with the pin 79 at the inside of the turn being negotiated, whereby further turning movements of the steering gear in the same direction will cause a forward shifting of the engaged pin 79 and its slide bar 80. If, under such forward shifting movements of the slide bar 80, the transmission mechanisms 28 are in forward drive position, the head 81 of the forwardly shifted slide bar 80 will engage the upper cam surface 51 of one of the shifter arms 49 and cause an upward shifting movement thereof back to neutral position of Fig. 10, whereas if the transmission mechanisms 28 are in reverse drive, the forwardly shifted head 81 of the affected slide bar 80 will engage the lower cam surface 52 of engaged head 50 and shift the same downwardly to neutral position of Fig. 10.

While I have herein described several embodiments which my invention may assume in practice, it will, of course, be understood that the same is capable of further modification without departing from the spirit and scope of the invention as expressed in the following claims.

What I claim is:

1. In a vehicle having laterally spaced drive wheels and a steerable ground-engaging wheel spaced from the drive wheels, steering gear for the steerable wheel, a driving engine, two power transmission mechanisms each interposed between the engine and a laterally opposite drive wheel and each providing neutral and forward drive for its respective wheel, each such transmission mechanism comprising a different and independently shiftable control element having neutral and forward drive positions, common primary control mechanism for the two transmission mechanisms; said common primary transmission control mechanism comprising a primary manually shiftable control element having forward drive and neutral positions, and branch operating connections extending from said common primary control element each to a different one of said independently shiftable transmission elements and each comprising a resilient link; and steering gear operated control mechanism for said transmission mechanisms; said steering gear operated control mechanism comprising a common actuating element operatively connected to and driven from the steering gear, and branch operating connections each operatively associated with the common actuating element, said branch operating connections each being operatively connected to the shiftable control element of a different one of said transmission mechanisms independently of the associated resilient link of the primary control mechanism; said resilient links being in an unloaded condition when the common primary control mechanism is in its neutral position and being loaded when the common primary control mechanism is in drive position and when in such loaded condition being further yieldable in the direction causing such loading to allow over-riding control by the steering gear operated control mechanism.

2. In a vehicle having laterally-spaced drive wheels and a steerable ground-engaging wheel spaced from the drive wheels, steering gear for the steerable wheel, a driving engine, two power transmission mechanisms each interposed between the engine and a laterally opposite drive wheel and each providing neutral and forward drive for its respective wheel, each such transmission mechanism comprising a different and independently shiftable element having neutral and forward drive positions, common primary control mechanism for the two transmission mechanisms; said common primary transmission control mechanism comprising a primary manually shiftable control element having forward and neutral drive positions, and branch operating connections extending from said common primary control element each to a different one of said independently shiftable transmission elements and each comprising a resilient link; and steering gear operated transmission control mechanism for shifting one of the transmission mechanisms from forward drive to neutral responsive to steering movements of the steering gear in one direction and for shifting the other of the transmission mechanisms from forward drive to neutral responsive to steering movements of the steering gear in the other direction; said steering gear operated transmission control mechanism comprising two cam followers each operatively associated with the shiftable element of a different one of said transmission mechanisms and connected thereto independently of said resilient links of the common primary control mechanism, and cam means operatively connected to the steering gear for operation therefrom and being operatively associated with said two cam followers, said resilient links being in an unloaded condition when the common primary control mechanism is in neutral position and being loaded when the common primary control mechanism is in drive position and when in such loaded condition being further yieldable in the direction causing such loading to allow over-riding control by the steering gear operated control mechanism.

3. In a vehicle having laterally spaced drive wheels and a steerable ground engaging wheel spaced from the drive wheel, steering gear for the steerable wheel, a driving engine, two power transmission mechanisms each interposed between the engine and a laterally opposite drive wheel and each providing neutral and forward and reverse drive for its respective wheel, each such transmission mechanism comprising a different and independently shiftable element having neutral and forward and reverse drive positions, common primary control mechanism for the two transmission mechanisms; said common primary transmission control mechanism comprising a primary manually shiftable control element having forward and neutral and reverse drive positions, and branch operating connections extending from said common primary control element each to a different one of said independently shiftable transmission elements and each comprising a resilient link; and steering gear operated transmission control mechanism; said steering gear operated transmission control mechanism comprising two pairs of relatively oblique cam followers of which each pair is operatively associated with the shiftable element of a different one of said transmission mechanisms and is operatively connected thereto independently of said resilient links of the primary control mechanism, steering gear operated cam means, and operative connections between the steering gear and said cam means, said cam means defining two pairs of cam surfaces, each cam surface being operatively associated with a respective follower, the cam followers having neutral and forward and reverse drive positions, means mounting and guiding the cam means for movements of its cam surfaces in predetermined paths of travel responsive to steering action of the steering gear, one cam follower of each pair thereof being disposed in and obliquely of the path of travel of its associated cam surface when said cam followers are in their reverse drive positions, said resilient links being in an unloaded condition when the common primary control mechanism is in its neutral position and being loaded when the common primary control mechanism is in drive position and when in such loaded condition being further yieldable in the direction causing such loading to allow overriding control by the steering gear operated control mechanism.

4. In a vehicle having laterally spaced drive wheels and a steerable ground engaging wheel spaced from the drive wheel, steering gear for the steerable wheel, a driving engine, two power transmission mechanisms each interposed between the engine and a laterally opposite drive wheel and each providing neutral and forward and reverse drive for its respective wheel, each such transmission mechanism comprising a different and independently shiftable element having neutral and forward and reverse drive positions, common primary control mechanism for the two transmission mechanisms; said common primary transmission control mechanism comprising a primary manually shiftable control element having forward and neutral and reverse drive positions, and branch operating connections extending from said common primary control element each to a different one of said independently shiftable transmission elements and each comprising a resilient link; and steering gear operated transmission control mechanism; said steering gear operated control mechanism comprising two pairs of relatively diverging cam followers of which each pair is operatively associated with the shiftable control element of a different one of the transmission mechanisms and is operatively connected thereto independently of said resilient links of the primary control mechanism for shifting movements with said associated shiftable control element between neutral and forward and reverse drive positions, and cam means operatively connected to the steering gear for movements generally toward and from the cam followers, means mounting and guiding the cam means for such movements, the steering gear moving the cam means in the direction of one pair of cam followers and away from the other pair of cam followers responsive to steering gear movements in one direction and toward the said other pair of cam followers and away from the first said pair of cam followers responsive to movements in the other direction, when in their neutral positions the relatively diverging cam followers of each pair thereof being disposed at opposite sides of the field of movement of the cam means, when the cam followers are in their forward drive positions one cam follower of each pair thereof being disposed in the field of movement of the cam means, and when the cam followers are in their reverse drive positions the other cam follower of each pair thereof being disposed in the field of movement of the cam means, said resilient links being in an unloaded condition when the common primary control mechanism is in its neutral position and being loaded when the common primary control mechanism is in drive position and when in such loaded condition being further yieldable in the direction causing such loading to allow overriding control by the steering gear operated control mechanism.

5. The structure defined in claim 4 in which the means for mounting and guiding the cam means also mounts and guides the cam means for movements in a plane that is angular to a direction of steering gear imparted movement thereof, the cam means having neutral and forward drive and reverse drive positions in said plane of movement and the latter two of which positions are spaced at opposite sides of neutral position thereof, and operating connections between the primary manually shiftable control element of the common primary control mechanism and said cam means for shifting the cam means in said plane of movement from neutral position to forward drive position responsive to forward shifting movements of the primary manually shiftable control element and shifting the cam means in said plane from neutral position to reverse drive position in said plane responsive to reverse shifting movements of the primary manual control element of the primary control mechanism.

6. In a vehicle having laterally spaced drive wheels and a steerable ground engaging wheel spaced from the drive wheel, steering gear for the steerable wheel, a driving engine, two power transmission mechanisms each interposed between the engine and a laterally opposite drive wheel and each providing neutral and forward and reverse drive for its respective wheel, each such transmission mechanism comprising a different and independently shiftable element having neutral and forward and reverse drive positions, common primary control mechanism for the two transmission mechanisms; said common primary transmission control mechanism comprising a primary manually shiftable control element having forward and neutral and reverse drive positions, and branch operating connections extending from said common primary control element each to a different one of said independently shiftable transmission elements and each comprising a resilient link; and steering gear operated transmission control mechanism; said steering gear operated control mechanism comprising two pairs of relatively diverging cam followers of which each pair is operatively associated with the shiftable control element of a different one of the transmission mechanisms and is operatively connected thereto independently of said resilient links of the primary control mechanism for shifting movements with said associated shiftable control element between neutral and forward and reverse drive positions, and single cam means selectively engageable with the two pairs of cam followers, means mounting and guiding the cam means for generally horizontal movements toward and from the cam follower and for generally vertical movements between neutral and forward and reverse positions, operating connections from the steering gear to the cam means for imparting thereto said horizontal movements generally toward and from the cam followers, and operating connections between the primary manually shiftable control element of the primary control mechanism and the cam means for imparting said vertical movements to the cam means between neutral and forward and reverse positions in correspondence with the movement of the primary manual control element to such positions, said resilient links being in an unloaded condition when the common primary control mechanism is in its neutral position and being loaded when the common primary control mechanism is in drive position and when in such loaded condition being further yieldable in the direction causing such loading to allow overriding control by the steering gear operated control mechanism.

7. In a vehicle having the manually controlled power steering mechanism as set forth in claim 1, in which said friction drive transmission mechanism comprises an engine driven roller element and roller-driven drum element, means mounting and guiding one of said elements for relative shifting movements toward and from the other thereof, and means for relatively shifting the cooperating roller and drum elements of said transmission mechanisms into and out of frictional driving engagement to provide neutral and variable speed friction drive to the cooperative drive wheels, the angle and direction of approach of the cooperating drum and roller elements being such that resistance to forward driving energy transmitted by the roller elements to the drum elements will increase the pressure between the cooperating roller and drum elements and forward driving energy transmitted by the drum elements to the roller elements will reduce the pressure between the cooperating drum and roller elements, whereby the drum elements are relatively free to run ahead of their cooperating roller elements to allow directional steering of the vehicle responsive to steering movements of the steerable wheel without skidding the ground wheels.

References Cited in the file of this patent

UNITED STATES PATENTS

| Number | Name | Date |
|---|---|---|
| 281,813 | Willson | July 24, 1883 |
| 603,047 | Pickering | Apr. 26, 1898 |
| 1,302,769 | Crellin | May 6, 1919 |
| 1,680,553 | Krotz | Aug. 14, 1928 |

FOREIGN PATENTS

| Number | Country | Date |
|---|---|---|
| 20,319 | Switzerland | Aug. 31, 1899 |
| 22,439 | Great Britain | 1897 |
| 26,415 | Great Britain | 1896 |